A. H. NEULAND.
ELECTROMAGNETIC TRANSMISSION.
APPLICATION FILED DEC. 17, 1917.
1,392,349.
Patented Oct. 4, 1921.
2 SHEETS—SHEET 2.
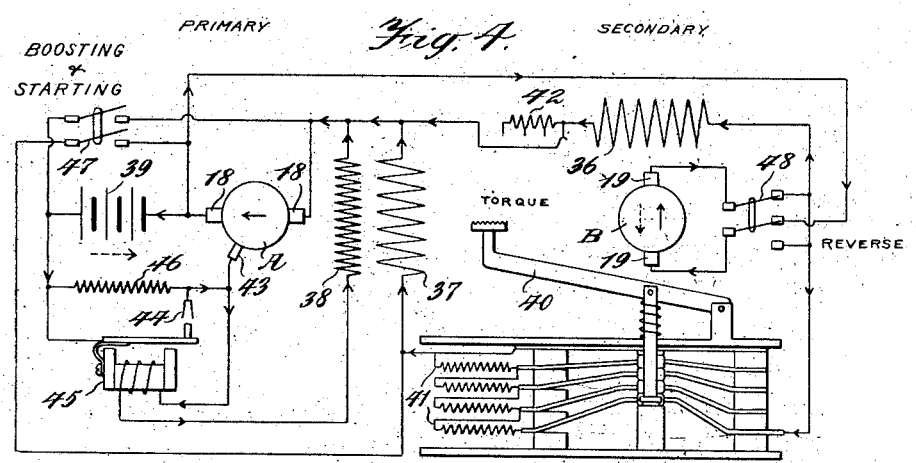
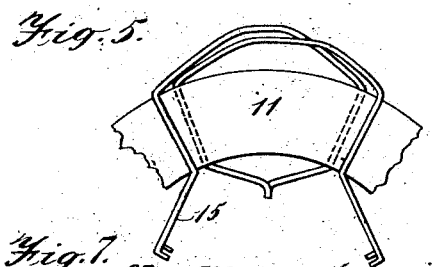
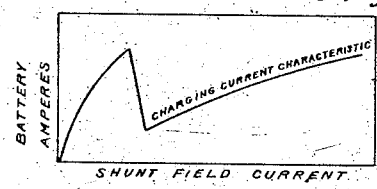
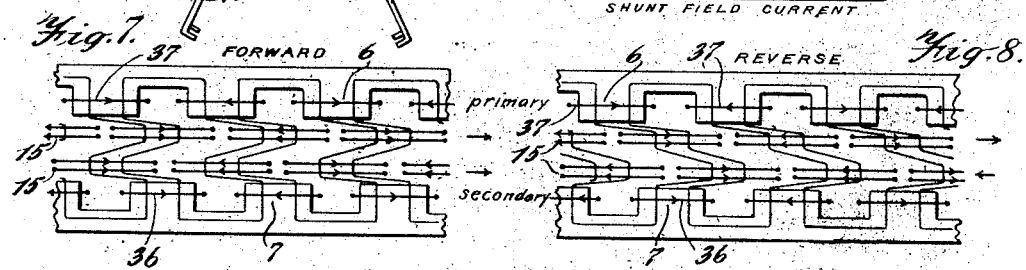
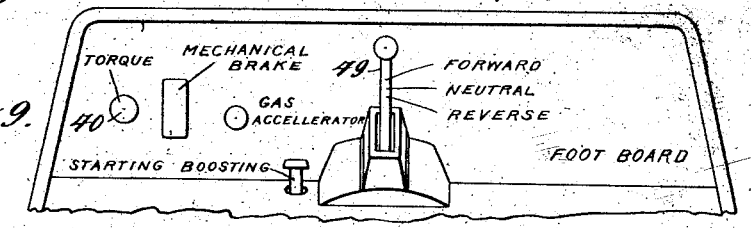
INVENTOR
Alfons X. Neuland
BY
Rosenbaum Stockbridge & Borst
ATTORNEYS

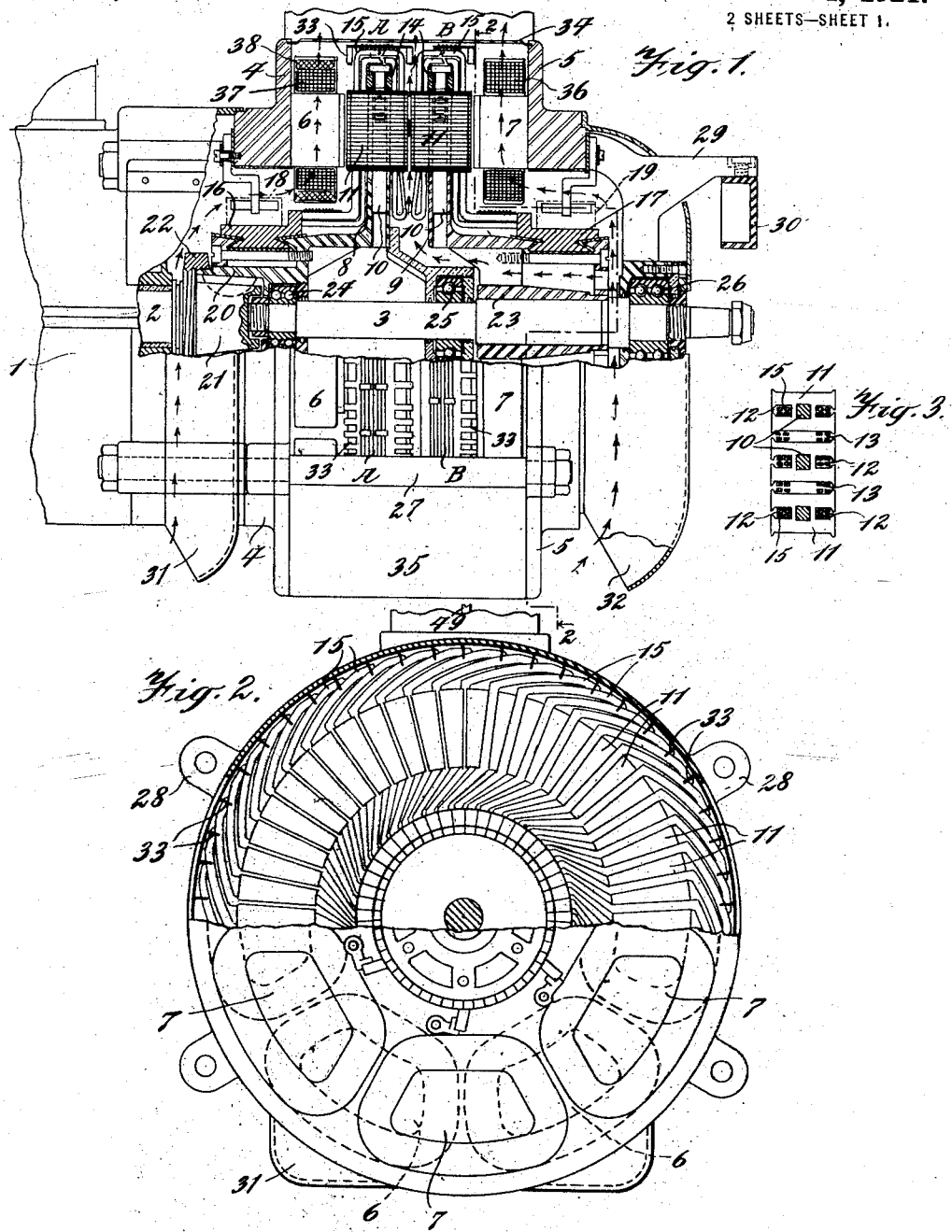

UNITED STATES PATENT OFFICE.

ALFONS H. NEULAND, OF SAN FRANCISCO, CALIFORNIA, ASSIGNOR TO NEULAND ELECTRICAL COMPANY, INC., OF SAN FRANCISCO, CALIFORNIA, A CORPORATION OF NEW YORK.

ELECTROMAGNETIC TRANSMISSION.

1,392,349.

Specification of Letters Patent. Patented Oct. 4, 1921.

Application filed December 17, 1917. Serial No. 207,509.

*To all whom it may concern:*

Be it known that I, ALFONS H. NEULAND, a citizen of the Provisional Government of Russia, residing at San Francisco, in the county of San Francisco and State of California, have invented certain new and useful Improvements in Electromagnetic Transmission, of which the following is a full, clear, and exact description.

My invention relates to electro-magnetic power transmission devices and embodiments of my invention are particularly adapted for transmitting power from a prime mover, the power or applied torque of which is adjustable, such as an internal combustion engine, to a driven member the load upon which is variable, and hence they are well adapted for automobile transmissions.

One object of my invention is to develop relatively great power within the device. Another object is to provide for reversal of one rotor relative to the other. Another object is to provide an effective and economical speed and torque control. Another object is to provide means whereby the speed of the engine is maintained within the limits of greatest efficiency and gas economy, without affecting the speed limits of the driven member. Another object is to provide a system for charging the battery which will be economical and permit the use of a battery composed of relatively few cells with a transmission wound for a relatively high voltage. Another object is to provide means for effectively and forcibly ventilating the device. Other objects are the provision of suitable means for mounting the transmission to the engine casing, facility and convenience in assembling the parts, strength and rigidity of the structure when assembled, and convenience in manipulation. Still other objects and advantages of my invention will appear from the following description.

Preferably my invention is embodied in a transmission of the disk type consisting of two armatures in the form of disks arranged side by side and acted on by the stationary flux from two annular field members disposed on the outer side of the respective armatures, the windings of the armatures being so connected through commutators and brushes that each armature also acts as a field for the other and thereby coupling them electro-magnetically. In this form the driving armature acts as the primary or generator armature and its field member is the primary or generator field member, while the current generated in this armature is fed to the other armature and to the windings of the two field elements. Hence the other armature acts as a secondary or motor armature and its field member as a secondary or motor field element.

One feature of my invention resides in a special form of armature winding arranged so that the turns are disposed with their spread circumferential of the armature, that is, with their axes parallel with that of the armature and so that each turn crosses the outer periphery of the armature with one-half on one side and the other half on the other side of the armature core. The armature core is provided with radial slots to prevent the flux from traversing the core circumferentially, and a part of the winding is lodged in these slots.

Also in accordance with my invention the windings of the two field elements are so connected as to permit differential field control and thus afford increased possibilities in torque regulation.

My invention further comprehends, as a means for maintaining the speed of the engine within economical limits, automatic means whereby at a constant or substantially constant propeller load the torque upon the driver or primary armature automatically increases when it is speeded up and is accompanied by a corresponding increase in the speed of the secondary armature and propeller shaft. By these means changing the speed of the primary results in a change in the speed of the secondary at a greater rate.

In accordance with my invention the battery is connected in series with a shunt winding on the primary field, and means are provided for rendering the battery and shunt currents independent of each other, which means include an equalizer in the form of an auxiliary brush on the commutator of the primary armature for carrying the difference between the battery and shunt currents when there is a difference. Means are also provided for preventing the rise of the charging current above the permissible maximum, without affecting the shunt current.

My invention also includes special means for uniting the transmission with the engine in a way that permits easy inspection, dismantling and which upon reassembly will insure proper alinement and spacing.

My invention also comprehends various features of mechanical construction and details and arrangements of parts as will hereinafter more fully appear.

I shall now describe the illustrated embodiment of my invention and shall thereafter point out my invention in claims.

Figure 1 is a partial longitudinal section and a partial side elevation of a complete transmission embodying my invention;

Fig. 2 is a broken transverse section of the same taken on line 2—2 of Fig. 1, looking in the direction of the arrows;

Fig. 3 is a development of a portion of the periphery of one of the armatures, showing in detail the shape of the armature sections in plan;

Fig. 4 is a diagram of the electric circuits;

Fig. 5 is a diagram showing the arrangement of an armature coil on the armature;

Fig. 6 is a diagram showing the curve of the battery charging current plotted against the shunt current;

Figs. 7 and 8 are diagrams of the magnetic parts showing the position and direction of the forces and fluxes, the former on forward rotation and the latter on reverse rotation of the secondary armature; and Fig. 9 is a plan of the foot board of the vehicle showing the arrangement of the manually and pedally operated control levers for the transmission.

The illustrated transmission is designed particularly for automobiles, the driving or primary armature A serving as the flywheel of the internal combustion engine 1, being carried by the crank or drive shaft 2 thereof, and the driven or secondary armature B being fixed to the propeller or driven shaft 3. The transmission is of the disk type, that is, the armatures are in the form of disks and are acted on at their sides.

The primary and secondary field yokes 4 and 5 are annular in shape and form part of the transmission housing at the front and rear ends, respectively. The inner portion of these yokes is relatively heavy for carrying the bulk of the flux, and each carries six equally spaced pole pieces on its inner face, the primary pole pieces being numbered 6 and the secondary pole pieces being numbered 7 in the drawings. The circumferential arrangement of the pole pieces is such that the centers of the poles of one field member fall intermediate those of the other member.

The armatures are disposed between the field members in close and inductive relation to the respective field members and in close and inductive relation to each other, and they are so constructed and arranged that the flux emerging from a pole of the primary field will in bulk traverse both armatures axially and reach a pole of the motor field, thence traversing the motor field to a pole of opposite polarity, thence traversing the cores of the two armatures axially and the primary field back to the first mentioned pole. It has been found that with this arrangement of fields one field may be modified in strength without the other field being correspondingly affected.

The spider of the primary armature A has an annular transversely arranged portion 8 flat on its inner face and the secondary armature B has a similar annular portion 9, these annular portions serving to support the laminations on their outer edge. As above mentioned the laminations forming the annular armature cores are divided by radial slots into a plurality of sector-shaped sections. Radial holes are drilled through these annular portions 8 and 9 and preferably broached square. Metal bars 10 of similar cross section are forced in these holes and are of such length as to extend radially a substantial distance out beyond the peripheries of the annular portions of the spiders. The number of bars on one spider should preferably differ from those on the other, a satisfactory arrangement being twenty-three on the primary armature and twenty-five on the secondary armature.

The laminated sections 11 of the armature cores are supported upon the radial extensions of these bars 10. Since the laminations are of sector-shape, the laminæ of the sections are of progressively increasing width from the inner side. These sections are provided with an intermediate slot 12 in both their inner and outer faces, a square opening being provided at the center of the sections which fits over the rods 10. These sections are therefore substantially H-shaped in cross section, as shown in Fig. 3, and are spaced apart so as to provide slots 13 between them. In this way when assembled on the spiders these laminations form disk armatures having on each side twice as many slots as there are sections or bars. These slots prevent the flux from traversing the armature circumferentially and force it to pass through both armatures axially, and the slots are preferably semi-closed in order to prevent any local flux variation. A non-magnetic ring 14 surrounds each armature as a band which holds the armature laminations on the bars 10 and keeps them properly spaced and rigid. These rings are secured to the outer ends of the bars 10 by means of screws and insulated therefrom, as shown.

The armature winding 15 of each armature is arranged in the slots 12 and 13, one part being lodged in the intermediate slots 12 and the rest of the winding being lodged in the spacing slots 13. The winding is especially arranged so that each turn, which is disposed transversely of the apparatus with its spread circumferential of the armature and its axis parallel to that of the armature, crosses the outer periphery of the armature core, one-half being embedded in a slot on one side of the armature and the other half being embedded in another slot circumferentially spaced from the first slot on the other side of the armature. The illustrated winding, as shown particularly in Fig. 5, comprises for the sake of convenient manufacture, two turns between the segments of the commutator to which the leads are connected, and the winding is so arranged that each turn crosses the outer periphery of the armature core, or in other words, the winding crosses the outer periphery of the core twice. This arrangement places each armature in effective inductive relation to the other armature as well as to its field. The winding consists of bar copper so arranged that there are four conductors per slot. Manifestly other types of winding may be used which will satisfy the conditions above described, to wit, that one-half of each turn be lodged on opposite sides of the armature core and arranged with its axis parallel to that of the armature, and the portion of the armature embraced within the coil be divided by slots. For instance, a single turn winding may be used, but in that case holes would have to be drilled through the spiders 8 and 9 in order to bring the lead on the inner face of the armature back to the commutator. Furthermore various known types of multiple reëntrant and multiplex windings may be employed and so arranged as to satisfy the conditions. A commutator 16 is carried by the primary armature on the outer side thereof, being arranged on the hub, as shown in Fig. 1, and similarly a commutator 17 is carried on the hub of the secondary armature. The armature windings are connected to the commutator segments in the usual way. Stationary brushes 18 and 19 wipe the commutators 16 and 17, respectively, these brushes being carried by holders attached to the respective field yokes 4 and 5. The hub 20 of the primary armature spider is internally tapered and keywayed and is directly mounted upon a tapered extension 21 of the crank shaft 2. The tapered extension and the hub are provided with opposing screw threads, one being righthand and the other lefthand, and a coupling nut 22, which is provided with correspondingly opposed threads, is employed to draw the hub upon the tapered end and lock the two together.

The hub 23 of the secondary shaft is pressed upon the shaft 3 and may be positively locked thereto against rotation, as by a spline. The inner end of the propeller shaft 3 extends forwardly through the primary armature into a bearing portion in the hub 20 and is locked thereto by means of a radial and thrust bearing 24. An intermediate bearing 25 may be employed if necessary. In this way the two armatures are locked together as a unit against relative axial movement while being free to rotate relative to each other, and at the same time they are separated from each other by a proper air gap. This unit is also held in place and axially spaced from the pole pieces by means of a radial and thrust bearing 26 locked to the propeller shaft 3 and to the stationary bearing housing. This construction renders assembly easy and assures proper spacing of the parts.

The field members are properly spaced from each other by means of four shouldered bolts 27 which pass through radial ears 28 provided on the field yokes and are held in place by lock nuts. As a means for attaching the transmission to the engine casing, properly disposed longitudinal holes are drilled in the engine casing in position for receiving the forward extensions of the bolts 27, as shown in Fig. 1. In this manner the transmission is alined with the engine crank shaft and secured to and made a part of the engine unit. The belts 27 are sufficiently strong to support the weight and to maintain alinement, but in order to relieve and minimize strains on the engine casing when traveling over rough roads, an arm 29 projects out from the secondary field yoke 5 which rests through the medium of an adjustable screw on a cross rib 30 of the more or less flexible automobile frame.

Particular provision is made for forcibly and effectively ventilating the device. For this purpose, in the illustrated construction, two downwardly extending scoop-shaped extensions 31 and 32, open in the direction of travel of the vehicle, are provided, the former being disposed in front of the transmission casing and shown as a part of the engine housing, while the other also serves as a cover and is attached to the rear end of the transmission casing. Also fan blades or vanes 32 are provided on the outer periphery of the armatures and secured thereto by the circumferential bands which hold the windings, and these vanes even at moderate speeds are very effective due to their large diameter. The two sides of the transmission casing are open while the top and bottom spaces are closed by rounded plates 34 and 35 which are lodged in arcuate grooves provided in the inner faces of the field yokes for the purpose. A part of the air supplied by the scoop shaped extensions 31 and 32 is conducted through the spider of the secondary armature to the interior of the machine and out through the gap between the armatures, as indicated by arrows; and another part flows over the commutators and brushes through the spaces between the field coils and is expelled by the fan blades through the side openings, as also indicated by arrows.

The electrical system of the apparatus is illustrated in the diagram of Fig. 4. The secondary field is made up of series coils 36 while the primary field has a compound winding consisting of the series coils 37 and the shunt coils 38. The stationary brushes 18 and 19 are connected by conductors which, with the armature windings, make a closed electric circuit including the magnet windings of the field. The storage battery 39 is connected across the brushes 18 in series with the shunt winding 38. It will, therefore, be seen that since the armatures are in close inductive relation to each other and their forces out of phase, they act as a field for each other. Since the brushes 18 are in planes intermediate those of the brushes 19, as shown in Fig. 4, there is a motor action between the two armatures and a portion of the torque is directly transferred from the primary armature A to the secondary armature B, irrespective of whether they rotate in the same or in the opposite directions. The rotation of the primary armature with respect to the stationary field of the secondary armature, moreover, generates a current in the primary armature which is amplified by reason of the latter's rotation with respect to the primary field poles on its other side. The generated current flowing through the secondary field exerts a torque on the secondary armature in addition to the torque produced on the secondary armature by the primary armature. This is clearly illustrated in the diagrams of Figs. 7 and 8.

The shunt winding 38 keeps the device magnetized when running light and prevents surging and a change of polarity. This shunt winding is, furthermore, the means employed in the specific illustrated device to effect the automatic speed variation between the primary and secondary armatures. The voltage of the primary armature A is proportional to the speed of this armature so long as the primary field remains constant, and its voltage is, of course, entirely independent of the rotation of the secondary armature B, since the brushes 19 are stationary. Therefore, while the load on the secondary is constant, the primary and secondary field components due to their series windings stay constant at any speed of the armatures. The primary field, however, being also acted on by the shunt winding is strengthened by an increase of the primary armature speed due to the increased voltage, with the result that the strengthened primary field increases the primary torque reaction and the load on the engine. Inasmuch as the secondary field remains the same due to the fact that the load is constant and that this field has only a series winding and a constant current flowing therethrough, the increased voltage due to the strengthened primary field impressed on the secondary armature causes the latter speed to increase at a higher rate than that of the primary armature. It will therefore be seen that when the propeller shaft is called on to supply a substantially constant torque, an increase of engine speed causes a correspondingly greater increase of speed of the propeller shaft and similarly a decrease in engine speed causes a correspondingly greater decrease in the speed of the propeller shaft. Therefore at low speeds the engine speed will exceed that of the propeller shaft while at high speeds the speed of the propeller shaft will exceed that of the engine. For example, the speed of the propeller shaft may be reduced to 100 revolutions per minute with an engine speed of 250 revolutions per minute, while an increase of the engine speed to 1000 revolutions per minute will be accompanied by an increase of the speed of the propeller shaft to 1500 revolutions per minute. Thus the engine is automatically relieved from a heavy load and permitted to run faster than the propeller shaft when the car speed is low, and is automatically loaded and relatively diminished in speed as the car speed increases. The engine is thereby kept loaded and running within reasonable speed limits without detracting from the speed limits of the car, which insures gas economy and efficiency, and furthermore, makes it possible to employ engines of fewer cylinders and of the two-cycle type.

In order to produce a secondary torque much in excess of the primary or engine torque when the vehicle is called upon to climb heavy grades, means are provided for simultaneously and oppositely varying the strength of the two fields. In the illustrated embodiment of my invention, this results from connecting the primary and secondary fields in multiple, as illustrated in Fig. 4, so that normally only a portion of the armature current flows through each field. When the load on the engine becomes too great, as in climbing a hill, it is possible by this arrangement of fields to decrease the torque reaction of the primary field upon the primary armature by weakening the primary field, which weakening of the primary field correspondingly strengthens the secondary field and increases the torque upon the secondary armature without an increase in the armature current. In the construction shown this is accomplished by depressing a torque lever 40 and gradually inserting the resistance 41 into the circuit of the series winding 37. This weakening of the primary field and the opening of the engine throttle permits the engine to speed-up with the result that the primary armature generates a larger armature current and a greater torque is produced upon the secondary armature. Furthermore, the weakening of the primary field results in a corresponding increase of strength in the secondary field and hence a still further increase of the torque upon the secondary armature. In other words, high speed of the primary armature is transformed into a high torque on the secondary armature so that the torque of the secondary armature greatly exceeds the maximum engine torque. By means of this simple differential control, the torque on the propeller shaft may be made greatly to exceed the engine torque with only a comparatively small increase of the armature current. This differential control is also of importance, since it insures better commutation, on account of the lesser armature reaction, and for the reason that in the first place the secondary field is strengthened, and in the second place that the brushes and commutator need carry a lighter current in order to produce a certain required torque than would be the case if a control were used which weakened the primary field without proportionately strengthening the secondary field.

Although the above described form of control permits of wide speed and torque variation, in some instances it is desirable to still further increase the range of control. This may be done, as shown in Fig. 4, by providing a resistance 42 in the secondary field which may be gradually inserted after the primary field resistance has been entirely short-circuited.

The battery 39 is, as above stated, charged by the shunt current, being in series with the primary shunt winding 38. Means are provided, however, for rendering the battery and shunt circuits independent of each other and for inserting a resistance into the battery circuit when the charging current becomes too heavy. The means for rendering the two circuits independent may be termed an equalizer, and consists of a small brush 43 on the commutator 16 of the armature A between the main brushes 18. This brush 43 is connected to the shunt circuit at a point intermediate the battery 39 and the shunt winding 38. The normal circuit of the battery 39 includes a switch 44 controlled by an electro-magnet 45 energized by the current of the shunt winding 38, and this switch 44 is arranged in parallel with a resistance 46.

As the speed and load upon the primary armature increase, its voltage increases in proportion thereto, and therefore the shunt current also increases in proportion to the voltage. When a maximum battery charging current has been reached, the electromagnet 45 opens the switch 44 and the resistance 46 is inserted into the battery circuit. This cuts down the charging current to a fraction of the maximum value and thereafter the voltage may rise to a considerable value before a maximum battery charging current is reached again. The characteristic of the charging current and its control by the shunt current are illustrated in Fig. 6, the sudden drop representing the insertion of the resistance. The field shunt current, of course, continues to rise, and since upon the opening of the switch 44 and the insertion of the resistance 46, the charging and shunt currents vary, brush 43 thereupon becomes operative as an equalizer and carries the difference. Under normal operating conditions the auxiliary brush 43 carries little or no current since there is but little difference between the charging and shunt field currents, and it is principally when the switch opens that this brush is called upon to carry a substantial equalizing current.

Due to the fact that the switch 44 is controlled by the shunt current, it will be observed that the switch will remain in actuated position, irrespective of the resultant sudden rise or fall of the charging current. The current in the shunt winding is dependent on the armature voltage only, and since the battery charging current is also dependent upon the voltage, the rise and fall of the current in the shunt winding very effectively and at the proper time actuates the switch 44, and, as stated, holds it in actuated position despite the sudden rise or fall of the battery charging current due to the actuation of the switch.

To operate the device as an engine starter, the switch 47 is closed, whereupon the windings of the armature A and of the primary field are both energized from the battery 39 and the two elements operate as a motor.

The device is reversed through the operation of the switch 48, which serves to reverse the connection between the brushes 18 and 19. In Figs. 7 and 8 is illustrated the path of the flux in the forward and reverse positions, respectively, of the switch 48, from which figures the direction of the torque upon the secondary armature can be readily comprehended. It will be noted that under the condition illustrated in Fig. 8 the flux cutting the primary armature is diminished since the current of the secondary armature is opposed to that of the primary field winding 37. In other words, the primary field is thereby weakened while the secondary field retains full strength, so that both the primary armature as well as the secondary field exert their full torque on the secondary armature in the reverse direction.

The arrangement of the operating levers is such as to be most convenient for manipulation in driving the automobile, and so as to require the same movements in operating the automobile as are required upon similarly located operating levers in most standard automobiles. This arrangement is illustrated in Fig. 9 in which is shown that portion of the foot board of an automobile whereon are mounted the usual levers. The reversing switch 48 is screwed on the top of the transmission casing and the manual lever 49 for operating this switch stands upright from the casing, as shown. The top of the transmission protrudes through the foot board in substantially the center thereof, and the lever 49 is therefore conveniently operated by the righthand of the driver. The switch 48 is a three-position switch, the intermediate position being neutral, and the lever 49 therefore controls the direction of the drive and also in the neutral position demagnetizes the transmission apparatus and thereby disengages the propeller shaft from the engine. At the left end of the foot board is the torque button 40 which is controlled by the driver's left foot, and the depression of which increases the propeller torque above the engine torque. The right foot of the driver operates the mechanical brake and to the right of that is the gas accelerator, while the engine starting and battery boosting button is arranged below the accelerator, as is usual. The steering wheel has no additional control levers and the vehicle is entirely controlled by the driver's foot. The results obtained by the pressing down of both foot levers are the same as in most standard automobiles at the present time, that is, it will bring the automobile to a stand-still. In order to again start the automobile from rest it is only necessary to release the right foot controlling the brake and transfer it to the gas accelerator to the right, thus speeding-up the engine. After that, the left foot control torque button is gradually released for straight driving. When coming to a grade which is too steep for the engine to furnish the requisite torque, it is only necessary to depress the torque button 40 with the left foot, thus permitting the engine to speed-up and by the change in relation produce a greater propeller torque.

It is obvious that various modifications may be made in the construction shown in the drawings and above particularly described within the principle and scope of my invention.

I claim:

1. An electro-magnetic power transmission device comprising a primary field element, a primary armature inductively related to the primary field element, one of said primary parts being rotatable and arranged to be driven by a prime mover, a secondary field element, and a secondary armature inductively related to the secondary field element and to the primary armature, one of said secondary parts being rotatable and arranged to be connected to a mechanical load, and the windings of the two field elements being connected in multiple and the two armatures being connected in series with each other and in series with the multiply connected fields.

2. An electro-magnetic power transmission device comprising a primary armature arranged to be driven by a prime mover, a secondary armature in inductive relation to the primary armature and arranged to be connected to a mechanical load, a stationary primary field inductively related to the primary armature, a stationary secondary field inductively related to the secondary armature, the windings of the two fields being connected in multiple, and means for simultaneously and oppositely varying the strength of the two fields.

3. An electro-magnetic power transmission device comprising a primary armature arranged to be driven by a prime mover, a secondary armature in inductive relation to the primary armature and arranged to be connected to a mechanical load, and means conductively connecting the two armatures and forming therewith a closed electric circuit arranged to include a stationary primary field inductively related to the primary armature and a stationary secondary field inductively related to the secondary armature, the windings of the two fields being connected in multiple.

4. An electro-magnetic power transmission device comprising a primary armature and a secondary armature, the windings of the two armatures being in inductive relation, a rotative commutator for each armature connected to the winding thereof, stationary brushes wiping each commutator, a primary stationary field element in inductive relation with the primary armature, a secondary stationary field element in inductive relation with the secondary armature, the brushes of one armature being arranged in planes intermediate those of the other armature and being conductively connected with those of the other armature making a closed circuit arranged to include the magnet windings of the field elements, the windings of the two fields being connected in multiple, and means for simultaneously and oppositely varying the strength of the two fields.

5. An electro-magnetic power transmission device comprising a primary armature and a secondary armature, the windings of the two armatures being in inductive relation, a rotative commutator for each armature connected to the winding thereof, stationary brushes wiping each commutator, a primary stationary field element in inductive relation with the primary armature, a secondary stationary field element in inductive relation with the secondary armature, the brushes of one armature being arranged in planes intermediate those of the other armature and being conductively connected with those of the other armature making a closed circuit arranged to include the magnet windings of the field elements and the windings of the two field elements being connected in multiple, and a variable resistance in the primary field winding.
6. An electro-magnetic power transmission device comprising a primary armature, a secondary armature inductively related to the primary armature, and means conductively connecting the two armatures and forming therewith a closed electric circuit arranged to include a primary field inductively related to the primary armature and having a strength dependent upon the speed of and load on the primary armature, and to include a secondary field inductively related to the secondary armature and having a strength proportional only to the load on the secondary armature, whereby a change in speed of the primary armature produces a change in speed of the secondary armature at a greater rate.
 7. An electro-magnetic power transmission device comprising a primary armature, a secondary armature inductively related to the primary armature, means conductively connecting the two armatures and forming therewith a closed electric circuit arranged to include a primary field inductively related to the primary armature and having a strength dependent upon the speed of and load on the primary armature, and a secondary field inductively related to the secondary armature, the field windings being so related to the respective armature windings that the strength of the primary field is dependent upon the speed of the primary armature and the strength of the secondary field is independent of the speed of the secondary armature, whereby a change in speed of the primary armature produces a change in speed of the secondary armature at a greater rate.
 8. An electro-magnetic power transmission device comprising a primary armature, a secondary armature inductively related to the primary armature, and means conductively connecting the two armatures and forming therewith a closed electric circuit arranged to include a primary field inductively related to the primary armature and a secondary field inductively related to the secondary armature, the primary field having a compound winding and the secondary field having only a series winding, whereby a change in speed of the primary armature produces a change in speed of the secondary armature at a greater rate.

9. In an electro-magnetic power transmission device, in combination with a coöperative field member, a rotative driving disk armature and a co-axial rotative driven disk armature, the two armatures being arranged side by side and each comprising an annular core provided with a plurality of spaced radial slots, and a winding thereon lodged in the slots and so arranged that each turn crosses the outer periphery of the core and has one-half disposed on each side of the core with its axis arranged axially of the armature and spreading substantially the distance of the pitch of the field poles.
 10. In an electro-magnetic power transmission device, a rotative driving disk armature and a co-axial rotative driven disk armature, the two armatures being arranged side by side and each comprising, in combination with a commutator, an annular core provided with a plurality of spaced radial slots, and a winding thereon lodged in the slots and comprising two turns between the commutator segments to which the leads are connected, the winding being arranged with its spread circumferential of the armature and so that each turn crosses the outer periphery of the core and has one-half disposed on each side of the core; and a field member disposed on the outer side of each armature in inductive relation thereto, the two field members being so arranged that their flux traverses the armature cores axially.
 11. In a dynamo-electric machine, two disk armatures arranged side by side and each including a winding having its individual turns crossing the outer periphery of the armature core and arranged with their spread circumferential of the armature, and a stationary field member disposed at the outer side of one armature with its poles in phase with the forces of the other armature and ranged so that its flux traverses the said armature axially, whereby the magneto-motive forces of the other armature and of the field member act conjointly on the said intermediate armature.
 12. In a dynamo-electric machine, a primary and a secondary disk armature arranged side by side and each including a winding having its individual turns arranged half on one side and half on the other side of the armature core and with their spread circumferential of the armature, a primary field member disposed by the outer side of the primary armature, and a secondary field member disposed by the outer side of the secondary armature, the poles of the two field members being arranged so that their fluxes traverse the armatures axially, whereby the magneto-motive forces of the primary field member and of the secondary armature act conjointly on the primary armature and the magneto-motive forces of the secondary field member and of the primary armature act conjointly on the secondary armature.

13. In a dynamo-electric machine, a primary and a secondary disk armature arranged side by side and each including a winding having its individual turns arranged half on one side and half on the other side of the armature core and with their spread circumferential of the armature, a primary field member disposed by the outer side of the primary armature, and a secondary field member disposed by the outer side of the secondary armature, the poles of the two field members being arranged intermediate of each other and so that their fluxes traverse the armatures axially, whereby the magneto-motive forces of the primary field member and of the secondary armature act conjointly on the primary armature and the magneto-motive forces of the secondary field member and of the primary armature act conjointly on the secondary armature.

14. An electro-magnetic power transmission device comprising a stationary part including a field member, a rotative driving disk armature and a co-axial rotative driven armature, the two armatures being arranged side by side within the magnetic field of the field member, a driven shaft extending axially of the two armatures and fixed to the driven armature, the driving armature having a bearing portion surrounding the driven shaft, a radial and thrust bearing secured between the driven shaft and said bearing portion of the driving armature and permitting relative rotation of the two armatures while locking them against relative axial movement in properly spaced relation, the stationary part also having a bearing portion surrounding the driven shaft, and a radial and thrust bearing secured between the driven shaft and said bearing portion of the stationary part and permitting rotation of the driven shaft within the bearing while locking the shaft against axial movement with the armatures in properly spaced relation to the field member.

15. A transmission mechanism comprising, in combination with an engine and a casing therefor having bolt-receiving longitudinally extending holes provided therein, a transmission unit operatively connected to the drive shaft of the engine, a suitable casing for the unit including end members having bolt-receiving portions provided with bolt holes, the bolt holes of the two end members being alined with each other and with the bolt-receiving holes in the engine casing, and bolts disposed within the alined holes and securing the transmission unit to the engine casing in properly alined relation.

16. A transmission mechanism comprising, in combination with an engine and a casing therefor having bolt-receiving longitudinally extending holes provided therein, a transmission unit operatively connected to the drive shaft of the engine, a suitable casing for the unit including end members having bolt-receiving portions provided with bolt holes, the bolt holes of the two end members being alined with each other and with the bolt-receiving holes in the engine casing, and shouldered bolts in the bolt holes of the two end members serving to properly space the end members and extending into the alined bolt-receiving holes in the engine casing, thereby securing the transmission unit to the engine casing in properly alined relation.

17. An electro-magnetic power transmission device comprising a casing including two annular field yokes disposed at opposite ends of the casing and provided at their outer edge with longitudinally arranged bolt-receiving holes, two relatively rotatable armatures arranged intermediate of the field yokes, and shouldered bolts disposed in the bolt-receiving holes of the two field yokes and securing them together in properly spaced relation.

In witness whereof, I subscribe my signature.

ALFONS H. NEULAND.